United States Patent
Suzuki et al.

(10) Patent No.: US 7,924,329 B2
(45) Date of Patent: Apr. 12, 2011

(54) NOISE ELIMINATOR

(75) Inventors: Kazuhiro Suzuki, Gifu (JP); Keishi Kato, Komaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 354 days.

(21) Appl. No.: 11/577,787

(22) PCT Filed: Oct. 18, 2005

(86) PCT No.: PCT/JP2005/019138
§ 371 (c)(1),
(2), (4) Date: Jun. 16, 2009

(87) PCT Pub. No.: WO2006/043563
PCT Pub. Date: Apr. 27, 2006

(65) Prior Publication Data
US 2009/0244331 A1  Oct. 1, 2009

(30) Foreign Application Priority Data

Oct. 22, 2004 (JP) .................. 2004-308459
Oct. 22, 2004 (JP) .................. 2004-308460
Oct. 25, 2004 (JP) .................. 2004-309107

(51) Int. Cl.
H04N 5/217 (2011.01)
(52) U.S. Cl. ......... 348/241; 348/243; 348/246; 348/247
(58) Field of Classification Search .................. 348/241, 348/243, 245, 246, 247; 382/245, 246, 247, 382/251
See application file for complete search history.

(56) References Cited

U.S. PATENT DOCUMENTS
6,809,763 B1  10/2004  Yoshida

FOREIGN PATENT DOCUMENTS

| JP | 6-350930 | | 12/1994 |
|---|---|---|---|
| JP | 11-298762 | | 10/1999 |
| JP | 11298762 | A * | 10/1999 |
| JP | 2000-50165 | | 2/2000 |
| JP | 2001-111899 | | 4/2001 |
| JP | 2003-69901 | | 3/2003 |
| JP | 2004-88306 | | 3/2004 |
| JP | 2005-295422 | | 10/2005 |
| WO | PCT/JP2005/019138 | | 2/2006 |
| WO | PCT/JP2005/019138 | | 4/2007 |

* cited by examiner

*Primary Examiner* — Yogesh K Aggarwal
(74) *Attorney, Agent, or Firm* — Ditthavong Mori & Steiner, P.C.

(57) ABSTRACT

A noise eliminator is provided which can highly compress and store dark current noise components while maintaining characteristics, including many high frequency components. A noise distribution analysis section 10 determines the magnitude distribution of dark current noise components of at least some pixels, and then computes the threshold and typical values for quantization based on this distribution. A quantization section 12 quantizes the dark current noise components based on the computed threshold value, and a memory 14 stores the quantized dark current noise components. An inverse quantization section 16 inversely quantizes the quantized dark current noise components stored in the memory 14 with reference to the typical value computed by the noise distribution analysis section 10. The inversely quantized dark current noise components are supplied to a subtraction section 18, and the subtraction section 18 subtracts the inversely quantized dark current noise components from an image signal.

3 Claims, 16 Drawing Sheets

| D5 |  | D7 |  | D9 |
|----|--|----|--|----|
|    |  |    |  |    |
| F5 |  | F7 |  | F9 |
|    |  |    |  |    |
| H5 |  | H7 |  | H9 |

NOISE ELIMINATOR

BACKGROUND OF THE INVENTION

1. Field of the Invention

The present invention relates to an apparatus which eliminates noise from an imaging device employed in digital cameras or cellular phones.

2. Description of the Related Art

Imaging devices such as CCD or CMOS sensors, which are employed in digital cameras or cellular phones, are affected by dark current that flows through the imaging elements or pixels even in the absence of incident light, thereby generating certain fixed pattern noise (dark current noise).

An apparatus for eliminating such dark current noise is disclosed in Patent Document 1. This apparatus first performs orthogonal transformation and quantization to compress dark current noise components, i.e., the image captured by an imaging device with the shutter closed, and then stores the resulting components in a memory device. When an image is actually captured, the dark current noise components decoded by inverse orthogonal transformation are subtracted from this image signal, thereby eliminating the dark current noise.

Orthogonal transformation and quantization, which is disclosed in Patent Document 1, as a method for compressing dark current noise, employs a technique that is well known in the art of image compression. This technique makes use of the typical nature of images that processing an image signal by orthogonal transformation causes most information to be given by lower frequency components. Thus, cutting off high frequency component information by quantization does not have many effects on the quality of the resulting image.

Patent Document 1: Japanese Patent Application Laid-Open No. Hei 11-298762.

(First Problem)

However, dark current noise components include many high frequency components and thus cutting off the high frequency component information would cause the dark current noise components to be improperly decoded. Accordingly, when the dark current noise components are compressed by orthogonal transformation and quantization, the high frequency component information cannot be cut off and thus compressibility cannot be improved.

(Second Problem)

Dark current noise components vary significantly depending on the temperature and the exposure time of an imaging device at the time of capturing an image as well as on the gain by which an image signal is multiplied when acquired from the imaging device as an analog signal. Accordingly, the magnitude of a pre-captured dark current noise component differs from the magnitude of a dark current noise component contained in an image signal acquired under actual capturing conditions. The dark current noise eliminator disclosed in Patent Document 1 was adapted to perform compression and decompression but could not properly eliminate the dark current noise components from the image signal because the pre-stored dark current noise components were subtracted, as they were, from the image signal.

(Third Problem)

Any signal delivered from an imaging device such as CCD or CMOS sensors, which are employed in digital cameras or cellular phones, includes the following types of noise in addition to an image signal. These are fixed pattern noise caused by dark current components, smear noise generated by intense incident light, fixed defect noise arising from a CCD defect caused during its manufacture, and random noise resulting from thermal fluctuations of the device. It is thus necessary to eliminate these noise components from signals delivered by the imaging device. In Japanese Patent Application Laid-Open No. 2004-172925, an apparatus is disclosed which first eliminates smear noise from a signal acquired by an imaging device and then removes fixed pattern noise caused by dark current.

To eliminate the smear noise using a circuit, it is necessary to estimate the amount of light incident upon the imaging device in order to estimate the magnitude of the smear noise. In this case, the amount of incident light is to be estimated based on a signal delivered from the imaging device. Accordingly, when the accuracy of estimating the smear noise is taken into consideration, no noise should be included in the signal that is used for the estimation.

However, as described above, a signal delivered from the imaging device includes various types of noise other than the smear noise. Among them is the fixed pattern noise that is caused by dark current. Since the dark current has a high dependence on temperature, an increase in the temperature of the imaging device by 7 degrees Celsius will double the magnitude of the fixed pattern noise. The fixed pattern noise also increases in proportion to the exposure time. As such, the signal delivered from the imaging device has a fixed pattern noise that greatly varies depending on the temperature and the exposure time of the imaging device. Accordingly, the device described in Japanese Patent Application Laid-Open No. 2004-172925 have a problem in that its estimation of the smear noise was greatly affected by the fixed pattern noise, thereby reducing the accuracy with which the smear noise can be eliminated.

SUMMARY OF THE INVENTION

The present invention according to a first aspect has been made to solve the aforementioned problem, and a general purpose thereof is to provide an apparatus for reducing dark current noise, i.e., a noise eliminator, which can highly compress and store dark current noise components while maintaining their characteristics, including many high frequency components.

The present invention according to a second aspect has been made to solve the aforementioned problem, and a general purpose thereof is to provide a noise eliminator, which can eliminate dark current noise components contained in an image signal with high accuracy.

The present invention according to a third aspect has been made to solve the aforementioned problem, and a general purpose thereof is to provide a noise eliminator which can eliminate a plurality of noise components, contained in a signal delivered from the imaging device, each with high accuracy.

(First Means)

First means according to an embodiment of the present invention relates to a noise eliminator. The eliminator includes a noise distribution analysis section, a quantization section, an inverse quantization section, and a subtraction section. The noise distribution analysis section analyzes a first image signal acquired by an imaging device with light blocked to determine the magnitude distribution of the first image signal of some or all pixels constituting the imaging device, specifies from this distribution a range within which a peak magnitude of the first image signal is included, and defines a threshold value within this range. The quantization section quantizes, based on the threshold value, a second image signal acquired by the imaging device with light blocked. The inverse quantization section inversely quantizes the quantized second image signal. The subtraction section subtracts the inversely quantized second image signal from a third image signal acquired by the imaging device with light incident thereon. As used herein, the phrase "with light blocked" refers to a condition in which, for example, the shutter provided at the front of the imaging device is closed to shut light out from the imaging device. This phrase also includes a condition of "light being substantially blocked" in which, for example, light is not completely blocked from the imaging device but partial leakage of light is incident thereon.

The greater part of the first and second image signals acquired with light blocked is made up of noise components caused by the dark current of the imaging device. Accordingly, in this embodiment, the noise components can be quantized to reduce the amount of information defining the noise components, thereby allowing for reduction in the memory capacity required to store noise components. Additionally, in the quantization process, the magnitude distribution of the noise components is determined, and based on the distribution, the range within which the magnitudes of the noise components are concentrated is specified for compression by quantization within that range. It is thus possible to highly compress and store the noise components while maintaining the noise characteristics, including many high frequency components.

In this embodiment, the first image signal and the second image signal may be acquired at different points in time. This allows for using two image signals acquired at different points in time to define a quantization threshold value and to perform quantization. It is thus not necessary to temporarily store captured image signals, thereby making it possible to reduce the memory capacity by that amount.

In this embodiment, the first image signal and the second image signal may be the same image signal. Additionally, the noise distribution analysis section may divide the first image signal into a plurality of regions; determine a magnitude distribution of the first image signal for each of the divided regions; specify from this distribution a range within which the peak magnitude of the first image signal is included; and define a threshold value within this range. This allows for acquiring an image signal only once with light blocked to store noise components or the acquired image signal, thereby making it possible to easily and quickly quantize the dark current noise components.

This embodiment may further include a band separation section which separates the first image signal and the second image signal into low frequency components and high frequency components, wherein the noise distribution analysis section, the quantization section, and the inverse quantization section are provided for the high frequency components, and wherein the low frequency components are added to the high frequency components inversely quantized at the inverse quantization section, to then supply the resulting components to the subtraction section. A noise component is different from pixel to pixel and thus predominantly consists of a high frequency component. Depending on the characteristics of the device or the power supply, however, the acquired noise information may also include a low frequency component. In such a case, the dark current noise can be separated into a low frequency component and a high frequency component so that the high frequency component is compressed according to the present invention, thereby allowing for restoring the noise component with higher accuracy.

Furthermore, this embodiment may further include a compression section which compresses the low frequency component by a method independent of that of the high frequency component, and a decompression section which decompresses the compressed low frequency component. With this arrangement, the decompressed low frequency component and the high frequency component inversely quantized at the inverse quantization section may be added together and supplied to the subtraction section. This allows for compressing the low frequency component and the high frequency component independently in a manner suited to the characteristics of the respective components, thus making it possible to restore the noise component with higher accuracy.

Second means according to another embodiment of the present invention relates to a noise elimination method. This method includes: determining a magnitude distribution of dark current noise components of an image signal acquired by an imaging device with light blocked; specifying a range within which a magnitude peak of the dark current noise components is included; defining a threshold value for quantization within the range; quantizing the dark current noise components based on the threshold value; inversely quantizing the quantized dark current noise components; and subtracting the inversely quantized dark current noise components from an image signal acquired when an image of a subject is actually captured.

According to this method, the quantization of the dark current noise components allows for reduction in the amount of information defining the dark current noise components, thereby making it possible to reduce the memory capacity required to store dark current noise components. Additionally, in the quantization process, the magnitude distribution of the dark current noise components is determined, and based on that distribution, the range within which the magnitudes of the dark current noise components are concentrated is specified for compression by quantization within that range. It is thus possible to highly compress and store the dark current noise components while maintaining the dark current noise characteristics, including many high frequency components.

(Second Means)

Second means according to an embodiment of the present invention relates to a noise eliminator. The eliminator includes a compression section, a decompression section, a noise component prediction section, and a subtraction section. The compression section compresses a first image signal acquired by an imaging device with light blocked. The decompression section decompresses the compressed first image signal. The noise component prediction section compares a state of the first image signal before compression by the compression section with a state of a second image signal acquired by the imaging device with light incident thereon, and based on this comparison, predicts noise components included in the second image signal from the decompressed first image signal. The subtraction section subtracts the predicted noise components from the second image signal.

As used herein, the phrase "with light blocked" refers to a condition in which, for example, the shutter provided at the front of the imaging device is closed to shut light out from the imaging device. This phrase also includes a condition of "light being substantially blocked" in which, for example, light is not completely blocked from the imaging device but partial leakage of light is incident thereon. Furthermore, the first image signal is generally equal to the noise components caused by the dark current present at the time at which the signal was acquired.

According to this embodiment, the state of the pre-captured first image signal can be compared with the state of the second image signal, thereby determining the relationship between the magnitude of an image signal acquired under the conditions in which the first image signal is acquired and the magnitude of an image signal acquired under the conditions in which the second image signal is acquired. It is thus possible to predict noise components included in the second image signal from the first image signal based on this relationship. Accordingly, this enables the elimination of noise components with high accuracy by subtracting the predicted noise components from the second image.

In this embodiment, the state of the first image signal may be defined by a magnitude of a signal delivered from a light-shielded region included in the yet-to-be compressed first image signal, while the state of the second image signal may be defined by a magnitude of a signal delivered from a light-shielded region included in the second image signal. Additionally, the noise component prediction section may determine a ratio between the magnitude of the signal delivered from the light-shielded region included in the second image signal and the magnitude of the signal delivered from the light-shielded region included in the yet-to-be compressed first image signal. Then, the noise component prediction section may multiply the decompressed first image signal by that ratio, thereby predicting the noise components included in the second image signal.

The signal delivered from a region, on which no light is incident, included in the second image signal is generally equal to noise components resulting from the dark current caused under the conditions in which the second image signal is acquired. Additionally, the signal delivered from a region, on which no light is incident, included in the first image signal is generally equal to noise components resulting from the dark current caused under the conditions in which the first image signal is acquired. It is thus possible to determine the ratio between the magnitudes of these signals, and then multiply the first image signal by this ratio, thereby predicting noise components included in the second image signal. This allows for subtracting the predicted noise components from the second image, thereby eliminating the noise components with high accuracy.

This embodiment may further include a pre-processing section which performs pre-processing on the compressed first image signal to predict noise components included in the second image signal, and the decompression section may decompress the pre-processed first image signal. According to this arrangement, the pre-processing for predicting the noise components included in the second image signal is performed with the once compressed first image signal not being decompressed but remaining compressed. The compressed image signal has a less amount of data than a decompressed image signal, thus making it possible to reduce the amount of computation required.

In this embodiment, the pre-processing section may separate the compressed first image signal into a low frequency component and a high frequency component. The decompression section may individually decompress the low frequency component and the high frequency component. The noise component prediction section may predict the high frequency component of the noise component included in the second image signal from the decompressed high frequency component and then add the resulting high frequency component to the decompressed low frequency component, thereby predicting the noise components included in the second image signal. In general, the dark current noise included in an image signal contains many high frequency components and is greatly affected by the conditions in which images are captured such as temperatures and exposure times. On the other hand, the low frequency component predominantly contains noises caused by power supplies and the characteristics of the device, and is comparatively less affected by the conditions for capturing images such as temperatures and exposure times. This allows for eliminating the low frequency components that are less affected by the image capturing conditions and predicting the high frequency components that are more affected by the image capturing conditions. It is thus possible to predict noise components with higher accuracy. Accordingly, it is possible to accurately eliminate the noise components that are included in an image.

In this embodiment, the state of the first image signal may be defined by a magnitude of high frequency components of a signal delivered from a light-shielded region included in the yet-to-be compressed first image signal. The state of the second image signal may be defined by the magnitude of high frequency components of a signal delivered from a light-shielded region included in the second image signal. The noise component prediction section may determine a ratio between the magnitude of high frequency components of a signal delivered from the light-shielded region included in the second image signal and the magnitude of high frequency components of a signal delivered from the light-shielded region included in the yet-to-be compressed first image signal. The noise component prediction section may then multiply the high frequency components of the decompressed first image signal by that ratio, thereby predicting the high frequency components of the noise components included in the second image signal. As such, using some or all pixels in a region on which no light is incident, the respective high frequency components of the first image signal and the second image signal are compared to each other and the ratio therebetween is computed, and the high frequency components of the first image signal are then multiplied by the resulting ratio. This makes it possible to accurately predict the noise components included in the second image signal, thus eliminating noises with high accuracy.

In this embodiment, the compression section may include: a noise distribution analysis section which analyzes the first image signal to determine the magnitude distribution of the first image signal that some or all pixels have, specifies from this distribution a range within which the peak magnitude of the first image signal is included, and defines a quantization threshold value within this range; and a quantization section which quantizes the first image signal based on the threshold value. In storing the first image signal, this arrangement allows for performing compression by quantization within the range within which the peak magnitude of the first image signal is included, thereby making it possible to compress and store the first image signal while maintaining the noise characteristics, including many high frequency components.

(Third Means)

Third means according to an embodiment of the present invention relates to a noise eliminator. The eliminator includes: a fixed-pattern noise elimination section which eliminates fixed pattern noise caused by dark current in an imaging device from an image signal delivered from the imaging device; and a smear noise elimination section which eliminates smear noise caused by incident light from the image signal with its fixed pattern noise eliminated.

According to this embodiment, the fixed pattern noise that has a temperature dependence and increases in proportion to the exposure time is removed from the image signal before the smear noise is eliminated. It is thus possible to use the image signal with the fixed pattern noise removed to estimate the smear noise, thereby eliminating the smear noise with high accuracy.

In this embodiment, the noise eliminator described in the aforementioned first means or second means may be utilized as the fixed-pattern noise elimination section. According to this embodiment, it is possible to effectively eliminate fixed pattern noise.

In this embodiment, the smear noise elimination section may eliminate the smear noise by subtracting, from the image signal with the fixed pattern noise removed, a value of an amount of sequentially accumulated smear charges that come from each light-receiving bit each time information charges accumulated in each light-receiving bit of the imaging device are transferred vertically line by line. According to this embodiment, it is possible to effectively eliminate fixed pattern noise.

This embodiment may further include a fixed defect noise elimination section which eliminates, from the image signal with the smear noise removed, a fixed defect noise arising from a defect caused during the manufacture of the imaging device. According to this embodiment, the smear noise is removed before the fixed defect noise is eliminated. It is thus possible to determine a defect pixel without being affected by a signal level saturated with smear noise. Furthermore, in removing the fixed defect noise, an interpolative image signal can be produced from the image signal from which the fixed pattern noise having a high noise level and the smear noise have been removed. It is thus possible to eliminate fixed defect noise more naturally.

In this embodiment, the fixed defect noise elimination section may determine whether each pixel of the imaging device is a fixed defect. If a pixel is determined to be a fixed defect, an interpolated value may be computed from surrounding pixels to replace the pixel with that value. According to this embodiment, it is possible to effectively eliminate fixed defect noise.

This embodiment may further include a random noise elimination section which eliminates random noise caused by thermal fluctuations of the imaging device from the image signal with the fixed defect noise removed.

According to this embodiment, using a method for performing estimated interpolation based on the features of surrounding pixels, random noise is removed when the other types of noise have been removed and the image signal of each pixel has nearly the true value. It is thus possible to eliminate random noise with high accuracy.

This embodiment may further include an offset elimination section which eliminates an offset component included in an image signal, wherein an image signal supplied to the offset elimination section is free from a fixed pattern noise, the noise being removed by the fixed-pattern noise elimination section.

According to this embodiment, since an offset component is computed after the fixed pattern noise has been removed, the offset component is computed without being affected by fixed pattern noise, thereby making it possible to eliminate offset components with high accuracy.

The offset elimination section may include: an offset computation section which extracts an image signal of a pixel that belongs to a light-shielded region of an imaging device from the image signals supplied to the offset elimination section, and then computes the average magnitude value of the extracted image signals as an offset component; and a subtraction section which subtracts the offset component from an image signal supplied to the offset elimination section. According to this embodiment, it is possible to effectively eliminate offset components.

Note that any combination of the aforementioned components, and representations of the present invention that are interchanged between methods, devices, systems, computer programs, data structures, or storage media are also valid as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 14 is an explanatory view illustrating a method for determining a fixed defect;

DETAILED DESCRIPTION OF THE INVENTION

First Group

First Embodiment

Figure 1:
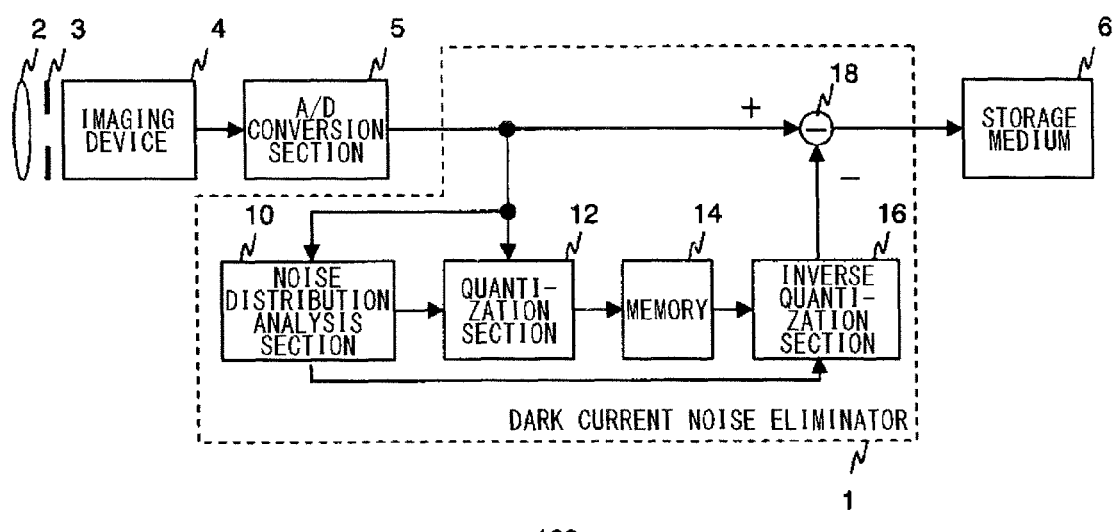
FIG. 1 is a view illustrating the configuration of a digital camera according to a first embodiment.

FIG. 1 is a view illustrating the configuration of a digital camera 100 with a dark current noise eliminator 1 according to a first preferred embodiment of the present invention. This arrangement can be implemented with hardware such as a CPU of any computer, a memory device, and other LSIs, or with software such as a memory-loaded program having a coding function. Illustrated here is a configuration of functional blocks that is implemented by a combination of these. Accordingly, it will be understood by those skilled in the art that the configuration of functional blocks can be implemented in a variety of ways, for example, only with hardware, only with software, or with a combination thereof.

The digital camera 100 includes a lens 2, a shutter 3, an imaging device 4, an A/D conversion section 5, and a storage medium 6 in addition to the dark current noise eliminator 1. Light reflected off a subject passes through the lens 2 and the shutter 3 to be incident upon the imaging device 4. The imaging device 4 converts the incident light into an electrical signal, which is in turn output as an image signal. By way of example, the imaging device 4 may be a CCD or CMOS sensor. The image signal delivered from the imaging device 4 is converted, for example, into a digital signal of 10 bits at the A/D conversion section 5, and thereafter, the dark current noise eliminator 1 removes dark current noise from the digital signal, so that the resulting signal is written on the storage medium 6.

The dark current noise eliminator 1 stores, as dark current noise components, an image signal which has been pre-captured by the imaging device 4 with the shutter 3 closed and then converted into a digital signal by the A/D conversion section 5. The dark current noise components are then subtracted from an image signal acquired when an image is actually captured, thereby eliminating the dark current noise from that image signal. At the time of storing the dark current noise components, the magnitude distribution of dark current noise components of all pixels that constitute an image is determined, and the range within which the peak of the dark current noise components is included is found based on this distribution. Then, compression by quantization is performed within that range. Note that as used herein, the magnitude of a dark current noise component is a value that is expressed by a digital signal provided by the A/D conversion section 5.

A description will now be made to the configuration of the dark current noise eliminator 1. The dark current noise eliminator 1 includes a noise distribution analysis section 10, a quantization section 12, a memory 14, an inverse quantization section 16, and a subtraction section 18. The noise distribution analysis section 10 analyzes the dark current noise components of all pixels, which are acquired when an image is captured with the shutter 3 closed, by counting the number of pixels occurring at each of the possible values over all the pixels to determine the distribution thereof.

For example, suppose that the dark current noise components of an image have values as shown below for each of 10 pixels that constitute the image;

{1, 3, 2, 5, 3, 3, 4, 5, 3, 2}.

When the dark current noise components can have values of 0 to 7, the noise distribution analysis section 10 determines the number of pixels occurring at these respective values as follows:

0 pixels at value 0, 1 pixel at value 1, 2 pixels at value 2, 4 pixels at value 3, 1 pixel at value 4, 2 pixels at value 5, 0 pixel at value 6, and 0 pixel at value 7.

Figure 2:
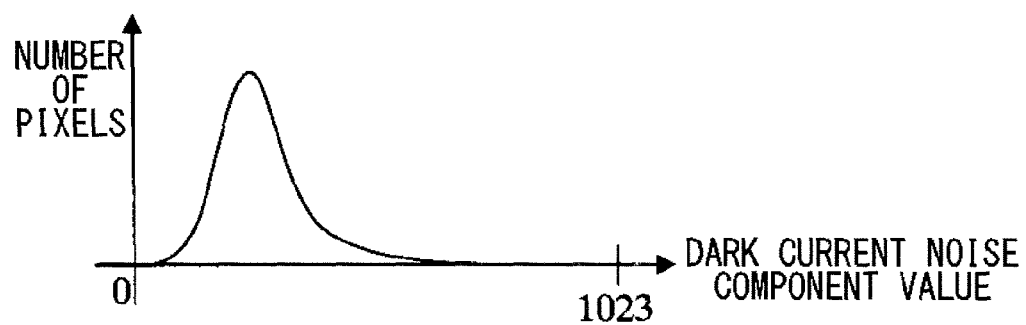
FIG. 2 is a view illustrating the magnitude distribution of dark current noise components.

The number of pixels of an image actually acquired from the imaging device 4 is several hundreds of thousands to several millions. Additionally, the possible values taken by a dark current noise component depends on the resolution of the A/D conversion section 5. For example, if the A/D conversion section 5 has a resolution of 10 bits, then the possible values taken by a dark current noise component are 0 to 1023. In this case, the noise distribution analysis section 10 analyzes the dark current noise components of all pixels acquired by the imaging device 4 to determine the number of pixels occurring at their respective possible values of from 0 to 1023. As a result, a distribution such as that shown in FIG. 2 can be obtained.

Figure 3:
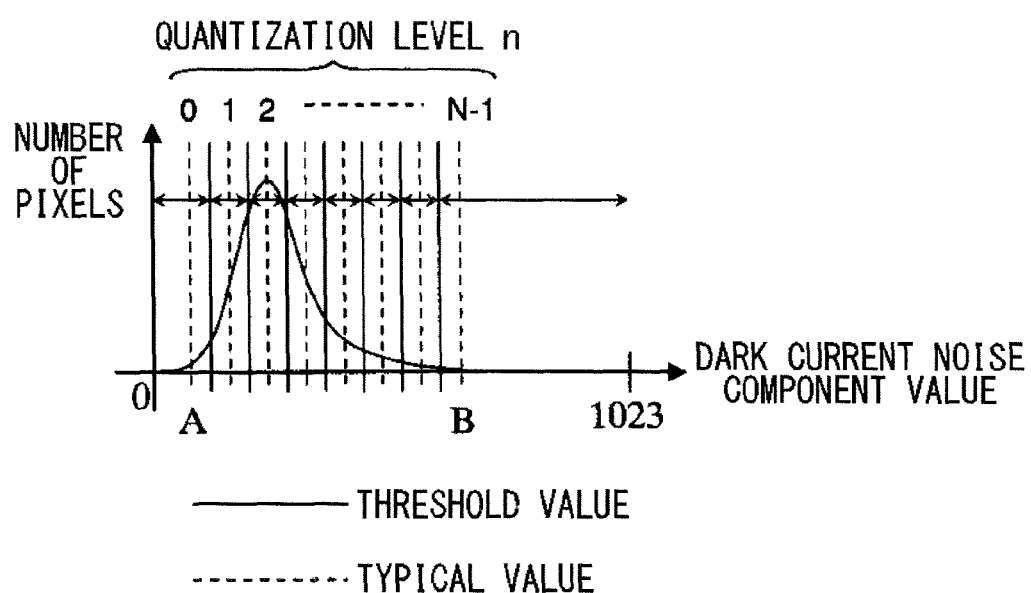
FIG. 3 is an explanatory view showing how to specify the range that includes the peak magnitude of dark current noise components and then compute the threshold and typical values for quantization within that range.

After having determined the distribution of the dark current noise components, the noise distribution analysis section 10 specifies a range from A to B within which the dark current noise components are concentrated as shown in FIG. 3. For example, assume that the lower limit A of this range is the value of the dark current noise component of the (x/512)th pixel given when counted in ascending order of the pixel values, where x is the number of pixels employed to determine the distribution. Assume also that the upper limit B is the value of the dark current noise component of the (x/512)th pixel given when counted in descending order of the pixel values. Note that this divisor is not limited to 512 but may be any value. Additionally, different divisors may also be used for the lower limit A and the upper limit B. Furthermore, the divisor may also be a variable that can be externally defined.

As an alternative method for determining the lower limit A and the upper limit B of this range, the peak position of the distribution of the dark current noise components may be specified in order to define the lower limit A and the upper limit B so that the number of pixels present between the lower limit A and the peak and the number of pixels present between the upper limit B and the peak take on a certain given value.

After having specified the range from A to B, the noise distribution analysis section 10 computes threshold and typical values for quantization so as to provide threshold values within this range for compression by quantization. For example, consider a case where the dark current noise components are quantized into N levels as shown in FIG. 3. In addition to this, these levels are labeled as quantization level 0, quantization level 1, quantization level 2, ..., and quantization level (N−1) in ascending order of the dark current noise component values from value zero to the greatest value. These levels are collectively represented by a quantization level n (n=0, 1, 2, ..., N−1). The noise distribution analysis section 10 determines the threshold value THn between the quantization level n and the quantization level (n+1) and the typical value Vn of the quantization level n by the following equation. These values are sent to the quantization section 12.

$$THn = DA + (2n+1)*(DB-DA)/(2*(N-1)) \quad (1),$$

and $$Vn = DA + 2n*(DB-DA)/(2*(N-1)) \quad (2),$$

where DA and DB represent the values of the dark current noise components at the lower limit A and the upper limit B. The threshold value THn is sent to the quantization section 12, whereas the typical value Vn is sent to the inverse quantization section 16.

With reference to the quantization threshold values determined by the noise distribution analysis section 10, the quantization section 12 quantizes the dark current noise components acquired when an image has been captured with the shutter 3 closed. For example, assuming that a dark current noise component has a magnitude of "a," a method described below is employed for quantization with reference to the threshold value THn determined by Equation (1), thereby yielding post-quantization data α.

If the dark current noise component "a" is less than the threshold value TH0, then the quantized data α is to be 0. Conversely, if the dark current noise component "a" is equal to or greater than the threshold value TH(N−2), then the quantized data α is to be (N−1). Additionally, if the dark current noise component "a" is equal to or greater than the threshold value TH(n−1) and less than THn, then the quantized data α is to be n. Note that the noise distribution analysis section 10 and the quantization section 12 serve as an example of the "unit for quantizing noise components" according to the present invention.

The data α quantized by the quantization section 12 in this manner is stored in the memory 14. At this time, the memory 14 may require less capacity compared with a case where the dark current noise components are not quantized. For example, assuming that N is 16, the quantized data α takes on values of 0 to 15. That is, the dark current noise component of a pixel which is originally expressed with 10 bits can be represented with 4 bits after having been quantized. Accordingly, in a case where the dark current noise components of one million pixels are stored in the memory 14, a capacity of ten million bits would be required if they are not quantized, whereas just four million bits are sufficient if they are quantized.

In sync with the delivery from the A/D conversion section 5 of an image signal acquired when an image is actually captured with the shutter 3 opened, the inverse quantization section 16 reads the quantized dark current noise components from the memory 14 to perform inverse quantization for decoding with reference to the typical values supplied from the noise distribution analysis section 10. In the inverse quantization method, the quantized data α read from the memory 14 is interpreted as the quantization level n with no change made thereto (i.e., n=α), and then the typical value Vn corresponding to the quantization level n is delivered to the subtraction section 18. The subtraction section 18 subtracts the dark current noise components inversely quantized by the inverse quantization section 16 from the image signal acquired when an image is actually captured.

A description will now be made to the operation of the digital camera shown in FIG. 1 based on the arrangement described above. First, with the shutter 3 closed, the imaging device 4 captures an image. At this time, since no light is incident upon the imaging device 4, the signal delivered from the imaging device 4 is indicative of dark current noise components.

The dark current noise components are converted into a digital signal at the A/D conversion section 5, and thereafter supplied to the noise distribution analysis section 10. The noise distribution analysis section 10 determines the magnitude distribution of the dark current noise components of all pixels, and uses this distribution to identify a range within which the peak of the dark current noise components is included, to compute the threshold value THn and the typical value Vn for quantization within that range.

Next, again with the shutter 3 closed, the dark current noise components are acquired in the imaging device 4. The dark current noise components are converted into digital signals at the A/D conversion section 5, and then supplied, this time, to the quantization section 12. Based on the threshold values determined by the noise distribution analysis section 10, the quantization section 12 quantizes the dark current noise components, so that the memory 14 stores the quantized dark current noise components.

The aforementioned operation is performed before an image of a subject is actually captured. The aforementioned operation, i.e., the steps up to the quantized dark current noise components being stored in the memory 14, may be performed each time an image is captured or at power-on of the digital camera. To perform the operation each time an image is captured, an image capture time detection section (not shown) may be provided to instruct the dark current noise eliminator 1 to quantize and store dark current noise components when an image capture time is detected. Dark current noise is susceptible to the ambient temperature of the imaging device. Thus, the dark current noise stored immediately before capturing an image would allow the dark current noise component values to be acquired with the highest accuracy. Conversely, to perform the operation at the power-on, a power-on time detection section (not shown) may be provided to instruct the dark current noise eliminator 1 to quantize and store dark current noise components when a power-on event is detected.

Alternatively, the quantized dark current noise components may be stored in the memory 14 during the manufacture of the digital camera. Alternatively, the digital camera may be provided with a timer (not shown) to instruct the dark current noise eliminator 1 at certain time intervals to quantize and store dark current noise components.

A description will now be made to the operation for actually capturing an image of a subject. This time, with the shutter 3 opened, the imaging device 4 captures an image. The image signal delivered from the imaging device 4 is converted at the A/D conversion section 5 into a digital signal, which is in turn sent to the subtraction section 18. As the image signal is delivered from the A/D conversion section 5, the inverse quantization section 16 reads the quantized dark current noise components stored in the memory 14. The inverse quantization section 16 also inversely quantizes the dark current noise components with reference to the typical values computed at the noise distribution analysis section 10. The inversely quantized dark current noise components are supplied to the subtraction section 18, and then the subtraction section 18 subtracts the inversely quantized dark current noise components from the image signal. This makes it possible to eliminate the dark current noise components from the image signal. Then, the image signal with the dark current noise components eliminated is written in the storage medium 6.

As described above, the following operational effects can be provided according to the first preferred embodiment of the present invention.

(1) Quantization of dark current noise components allows the amount of dark current noise component information to be significantly reduced, thereby making it possible to reduce the memory capacity required to store the dark current noise components.

(2) In the quantization process, the magnitude distribution of dark current noise components is determined, and based on that distribution a range within which the peak magnitude of the dark current noise components is included is specified for compression by quantization within that range. It is thus possible to compress the dark current noise components while maintaining the noise characteristics, including many high frequency components.

(3) Dark current noise components could be divided into blocks for orthogonal transformation and subsequent quantization as is conventionally done. However, in this case, since each block has a different quantization parameter, noise will occur on a boundary between blocks when the dark current noise components are inversely quantized. In contrast to this, this embodiment performs quantization across all the dark current noise components using the same threshold value. This will prevent the occurrence of the aforementioned noise when the quantized dark current noise components are inversely quantized.

(4) Two dark current noise components captured at different times are used to define a quantization threshold value and perform quantization. This eliminates the need for temporarily storing captured dark current noise components, thereby allowing for reducing the memory capacity. That is, the dark current noise components initially acquired are used to define a quantization threshold value. The dark current noise components only need to be held at this moment of defining the quantization threshold value, and thereafter these data regarding the dark current noise components may be erased. Additionally, the next acquired dark current noise components are used to perform quantization. These dark current noise components only need to be held at this moment of quantization, and thereafter these data regarding the dark current noise components may be erased. There is thus no need to hold dark current noise components between the quantization threshold value defining process and the quantization process, thereby making it possible to reduce the memory capacity.

Second Embodiment

Figure 4:
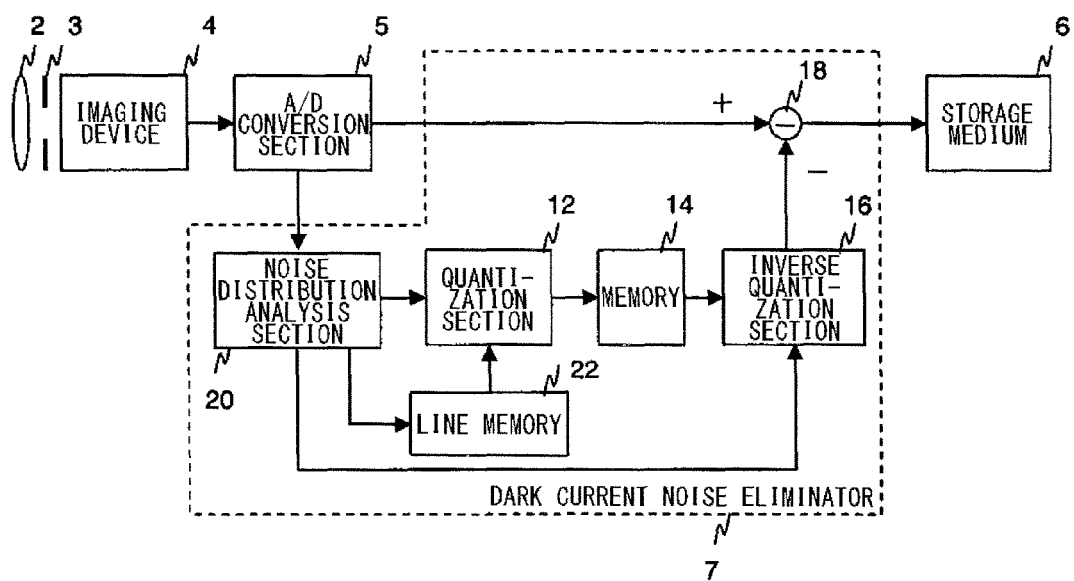
FIG. 4 is a view illustrating the configuration of a digital camera according to a second embodiment.

FIG. 4 is a view illustrating the configuration of a digital camera 110 with a dark current noise eliminator 7 according to a second preferred embodiment of the present invention. The digital camera 110 is provided with a noise distribution analysis section 20, which has a different functionality from that of the noise distribution analysis section 10 of the digital camera 100 according to the first embodiment, and is additionally provided with a line memory 22. The components which are the same as those of the first embodiment are indicated with the same reference symbols and will not be explained again.

Figure 5:
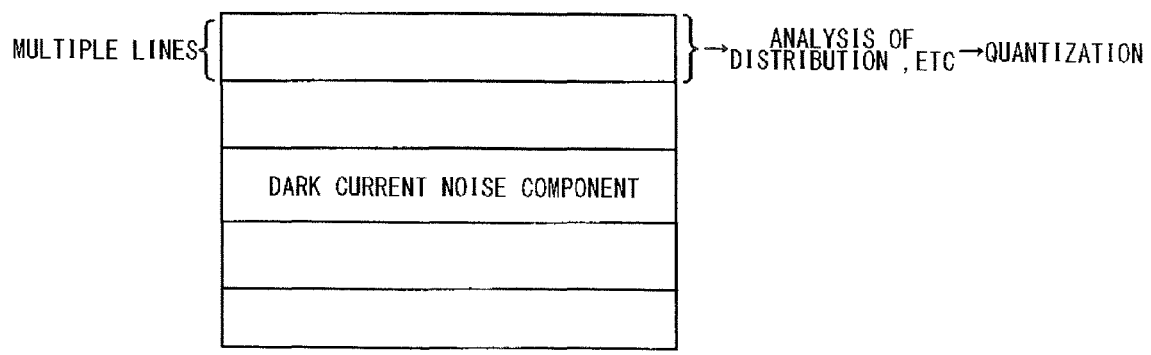
FIG. 5 is an explanatory view illustrating how to divide dark current noise components into a plurality of lines.

The noise distribution analysis section 20 of the second embodiment differs from the noise distribution analysis section 10 of the first embodiment as follows. The magnitude distribution of dark current noise components does not cover all pixels, but rather the dark current noise components are divided into regions each comprising a plurality of lines as shown in FIG. 5. Within a divided region, the magnitude distribution of dark current noise components is determined, and the quantization threshold value and the typical value are computed. Additionally, the noise distribution analysis section 20 allows the line memory 22 to store the plurality of lines of dark current noise components for which the quantization threshold value and the typical value have been computed.

Based on the arrangement described above, a description will now be made to the operation of the digital camera shown in FIG. 4. First, with the shutter 3 closed, the imaging device 4 acquires dark current noise components. The dark current noise components are converted at the A/D conversion section 5 into a digital signal, which is in turn supplied to the noise distribution analysis section 20. The noise distribution analysis section 20 determines the magnitude distribution of dark current noise components of the pixels present in the first plurality of lines, and uses this distribution to compute the quantization threshold value and the typical value. Additionally, the noise distribution analysis section 20 allows the line memory 22 to store the plurality of lines of dark current noise components for which the distribution has been determined and the quantization threshold value and the typical value have been computed.

Next, the quantization section 12 reads the dark current noise components stored in the line memory 22 to perform quantization with reference to the threshold value computed by the noise distribution analysis section 20. Then, the quantized dark current noise components are stored in the memory 14. At this time, the noise distribution analysis section 20 determines the magnitude distribution of dark current noise components of the pixels present in the next plurality of lines, and uses this distribution to compute the quantization threshold value and the typical value for the next region. Additionally, the line memory 22 is overwritten with that plurality of lines of dark current noise components. Subsequently, the noise distribution analysis section 20, the quantization section 12, and the line memory 22 repeat the aforementioned operation for each of a plurality of lines. This makes it possible to perform compression by quantization on the dark current noise components of all pixels and then store the quantized dark current noise components in the memory 14.

The aforementioned operation is performed before an image of a subject is actually captured. The operation for actually capturing an image of a subject is the same as the operation described in relationship to the first embodiment, and thus omitted.

As described above, the second embodiment can provide the following operational effects in addition to the operational effect of highly compressing and storing dark current noise components while keeping the characteristics, including many high frequency components. That is, according to the second embodiment, dark current noise components are divided into a plurality of regions to determine, for each region, the magnitude distribution of dark current noise components and compute the quantization threshold value and the typical value. Additionally, the dark current noise components in the region for which the threshold value and the typical value have been computed are once stored in the line memory, so that the dark current noise components stored in the line memory are quantized. It is thus possible to capture dark current noise components only once as well as to easily quantize the dark current noise components in a short time.

Third Embodiment

Figure 6:
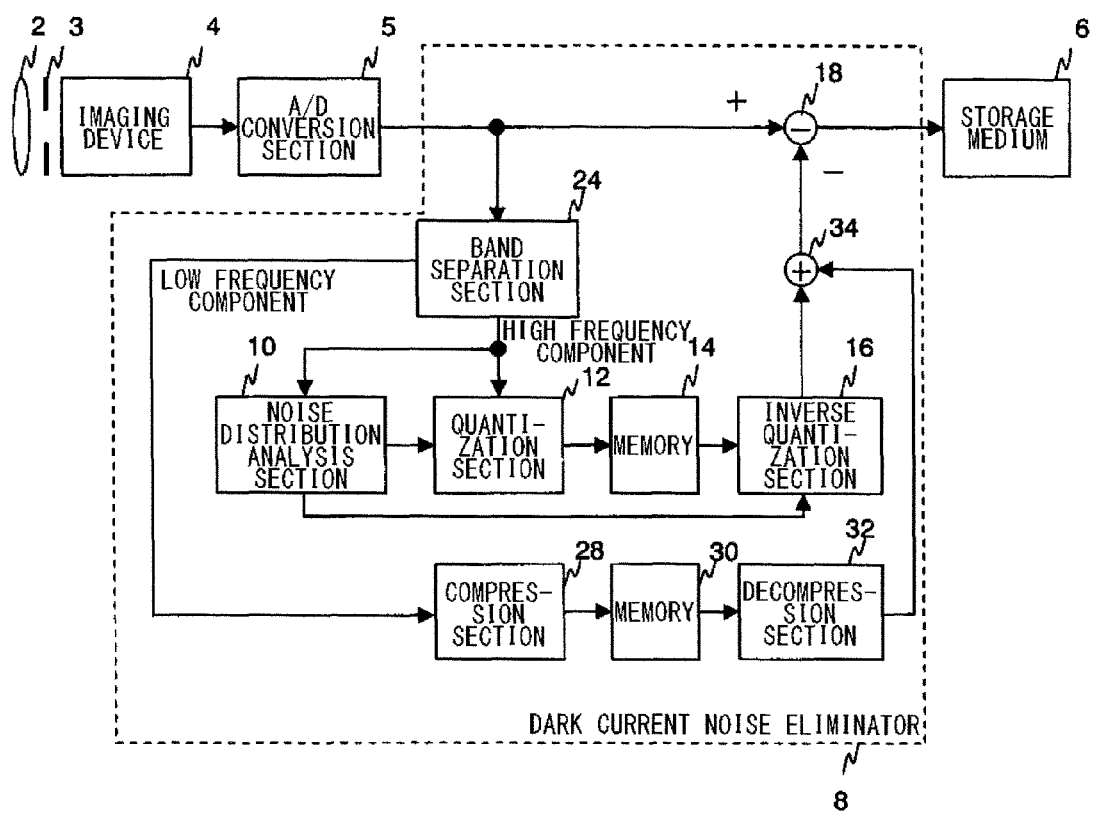
FIG. 6 is a view illustrating the configuration of a digital camera according to a third embodiment.

FIG. 6 is a view illustrating the configuration of a digital camera 120 with a dark current noise eliminator 8 according to third preferred embodiment of the present invention. The digital camera 120 is the digital camera 100 according to the first embodiment that is additionally provided with a band separation section 24, a compression section 28, a memory 30, a decompression section 32, and an addition section 34. The components which are the same as those of the first embodiment are indicated with the same reference symbols and will not be explained repeatedly.

The band separation section 24 separates dark current noise components into low frequency components and high frequency components. The compression section 28 compresses the low frequency components separated by the band separation section 24. This compression method may be a method for determining the difference between the low frequency components of a pixel to be compressed and an adjacent pixel, or a method for dividing the low frequency components by a predetermined quantization coefficient for quantization. There is also another method available in which low frequency components are extracted at predetermined pixel intervals, and low frequency components of the other pixels are discarded. Alternatively, a combination of these methods may also be employed. The memory 30 stores the low frequency components compressed at the compression section 28.

The decompression section 32 reads the compressed low frequency components stored in the memory 30 for decompression. For example, suppose that the method for determining the difference between the low frequency components of a pixel to be compressed and an adjacent pixel is employed to compress low frequency components at the compression section 28. In this case, the value stored in the memory 30 and the low frequency component of the adjacent pixel are added for decompression. On the other hand, when the method for dividing low frequency components by a predetermined quantization coefficient for quantization is employed for compression, the value stored in the memory 30 is multiplied by the quantization coefficient for decompression. Suppose that the method for extracting low frequency components at predetermined pixel intervals with the low frequency components of the other pixels discarded is employed for compression. In this case, the low frequency components of the pixels stored in the memory 30 are filtered to thereby determine the low frequency components of all pixels for decompression.

Note that the noise distribution analysis section 10, the quantization section 12, the memory 14, and the inverse quantization section 16 function in the same manner as those incorporated in the digital camera according to the first embodiment. However, they act upon the high frequency components of the dark current noise separated at the band separation section 24.

The addition section 34 adds the low frequency components of the dark current noise decompressed at the decompression section 32 and the high frequency components of the dark current noise inversely quantized at the inverse quantization section 16 to decode the dark current noise.

Based on the arrangement described above, a description will now be made to the operation of the digital camera shown in FIG. 6. First, dark current noise components captured with the shutter 3 closed are converted at the A/D conversion section 5 into a digital signal, which is in turn separated into low frequency components and high frequency components at the band separation section 24. Then, the noise distribution analysis section 10 determines the magnitude distribution of the high frequency components of all pixels, and uses this distribution to compute the quantization threshold value and the typical value of the high frequency components.

Next, dark current noise components are captured at the imaging device 4 again with the shutter 3 closed, and then converted at the A/D conversion section 5 into a digital signal, which is in turn separated at the band separation section 24 into low frequency components and high frequency components. Then, the low frequency components are compressed at the compression section 28, and the compressed low frequency components are stored in the memory 30. Furthermore, the high frequency components are supplied to the quantization section 12 to be quantized based on the threshold value determined by the noise distribution analysis section 10, and then the quantized high frequency components are stored in the memory 14.

The aforementioned operation is performed before an image of a subject is actually captured. A description will now be made to the operation for actually capturing an image of a subject. This time, with the shutter 3 opened, the imaging device 4 captures an image. The image signal delivered from the imaging device 4 is converted at the A/D conversion section 5 into a digital signal, which is in turn sent to the subtraction section 18. On the other hand, in sync with the delivery from the A/D conversion section 5 of the image signal, the decompression section 32 reads the quantized low frequency components of the dark current noise stored in the memory 30 as well as decompresses the low frequency components of the dark current noise.

Likewise, in sync with the delivery from the A/D conversion section 5 of the image signal, the inverse quantization section 16 reads the quantized high frequency components of the dark current noise stored in the memory 14 as well as inversely quantizes the high frequency components of the dark current noise with reference to the typical value computed at the noise distribution analysis section 10. Then, these inversely quantized low frequency components and high frequency components are added together at the addition section 34, thereby decoding the dark current noise components. Then, the dark current noise components are supplied to the subtraction section 18, and the subtraction section 18 subtracts the inversely quantized dark current noise components from the image signal, thereby eliminating the dark current noise components from the image signal.

The dark current noise itself varies from pixel to pixel and thus predominantly consists of high frequency components. Depending on the characteristics of the device or the power supply, the acquired noise information may include low frequency components. The third embodiment can provide the following operational effects.

(1) Dark current noise is separated into low frequency components and high frequency components to determine the magnitude distribution of the high frequency components that are dominant in the dark current noise. Based on this distribution, a range within which the peak magnitude of the high frequency components of the dark current noise is included is specified for compression by quantization within that range. It is thus possible to restore the dark current noise with higher accuracy.

(2) Independent compression methods are applied to low frequency components and high frequency components, respectively. This allows for compressing the components in accordance with the characteristics of the respective components, thereby making it possible to restore the dark current noise with higher accuracy.

In the foregoing, the present invention has been described in accordance with the first to third embodiments. It is to be understood by those skilled in the art that these embodiments are only illustrative and various modifications can be made to the combinations of each of their components and process steps, and those modifications will also fall within the scope of the present invention. Such modified examples will be illustrated below.

In the aforementioned embodiments, digital cameras were shown by way of example; however, the invention is not limited thereto. Any device can be equipped with the dark current noise eliminator according to the embodiments of the present invention so long as the device includes an imaging device.

In the aforementioned second embodiment, such an example has been shown in which a line memory is provided and dark current noise components are divided into a plurality of regions, so that the quantization threshold value is determined within a divided range to perform quantization. In addition to this, as described in the first embodiment above, one of two dark current noise components captured at different times may be used to determine the quantization threshold value, and the other dark current noise component may be subjected to quantization. Either one of these quantization methods may be selectively used.

The selectable usage of these quantization methods makes it possible to choose an optimum quantization method according to the performance of a system which incorporates the dark current noise eliminator, the number of pixels of an image being captured, or the shooting mode that the user defines.

In the aforementioned third embodiment, a line memory is additionally disposed between the noise distribution analysis section 10 and the quantization section 12 as in the aforementioned second embodiment, thereby allowing a plurality of lines of low frequency components and high frequency components used in the noise distribution analysis sections 10 and 26 to be stored in the line memory. This also allows the aforementioned third embodiment to divide the dark current noise components into a plurality of lines, so that within a divided range, the dark current noise components can be provided with the quantization threshold value and quantized. It is thus possible to provide the same operational effects as those of the aforementioned second embodiment.

Second Group

Fourth Embodiment

Figure 7:
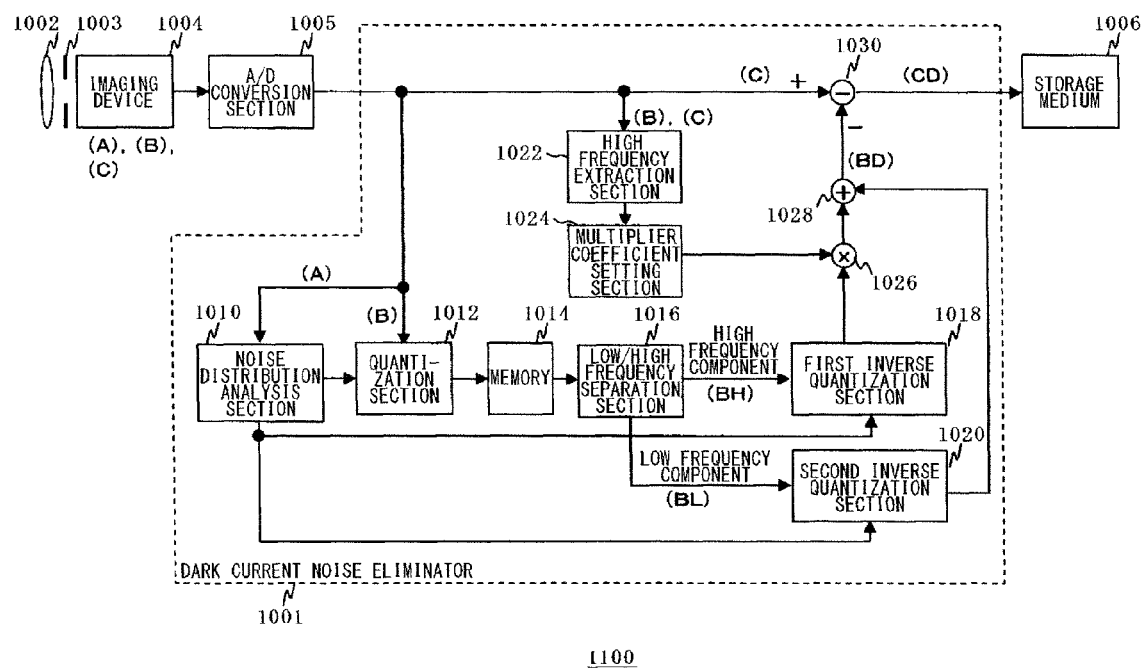
FIG. 7 is a view illustrating the configuration of a digital camera according to a fourth embodiment.

FIG. 7 is a view illustrating the configuration of a digital camera 1100 with a dark current noise eliminator 1001 according to a fourth preferred embodiment of the present invention. This arrangement can be implemented with hardware such as a CPU of any computer, a memory device, and other LSIs, or with software such as a memory-loaded program having a coding function. Illustrated here is the configuration of functional blocks that is implemented by a combination of these. Accordingly, it will be understood by those skilled in the art that the configuration of functional blocks can be implemented in a variety of ways, for example, only with hardware, only with software, or with a combination thereof.

The digital camera 1100 includes a lens 1002, a shutter 1003, an imaging device 1004, an A/D conversion section 1005, and a storage medium 1006 in addition to the dark current noise eliminator 1001. Light reflected off a subject passes through the lens 1002 and the shutter 1003 to be incident upon the imaging device 1004. The imaging device 1004 converts the incident light into an electrical signal, which is in turn output as an image signal. By way of example, the imaging device 1004 may be a CCD or CMOS sensor. The image signal delivered from the imaging device 1004 is converted, for example, into a digital signal of 10 bits at the A/D conversion section 1005. The value represented by the digital signal corresponds to "the magnitude of an image signal" according to the present invention. Furthermore, when an image signal having been converted into a digital signal is separated into a low frequency component and a high frequency component, the value of the respective components represented by a digital signal is also included in "the magnitude of the image signal".

The dark current noise eliminator 1001 removes the dark current noise from the image signal that has been converted into a digital signal at the A/D conversion section, and the resulting image signal is written in the storage medium 1006.

The dark current noise eliminator 1001 stores, as dark current noise components, the image signal pre-captured by the imaging device 1004 with the shutter 1003 closed and converted into a digital signal by the A/D conversion section 1005. The dark current noise components are then subtracted from an image signal acquired when an image is actually captured, thereby eliminating the dark current noise. At the time of storing the dark current noise components, the magnitude distribution of the dark current noise components of all pixels that constitute the image is determined, and a range within which the peak of the dark current noise components is contained is specified based on this distribution. Then, compression by quantization is performed within that range. Note that as used herein, the magnitude of a dark current noise component refers to a value that is expressed by a digital signal acquired by the A/D conversion section 1005.

Furthermore, in subtracting the dark current noise components from the image signal, the dark current noise eliminator 1001 compares the state of the dark current noise components when pre-captured with the state of the image signal when captured. Based on this comparison, the dark current noise components included in the image signal are predicted from the pre-captured dark current noise components. For example, since the imaging device 1004 has a region on which light is never incident, the image signal delivered from that region can be considered to be the dark current noise component of a pixel in the region. In this regard, a ratio is determined between an image signal, of the image signals captured in the presence of incident light, delivered from a pixel included in a region on which light is never incident (a light-shielded region) and a dark current noise component, of the pre-captured dark current noise components, delivered from the same pixel. The entire pre-captured dark current noise components are then multiplied by this ratio, thereby predicting the dark current noise components included in the image signal with high accuracy.

Furthermore, the dark current noise eliminator 1001 separates the pre-captured dark current noise and the image signal delivered from a light-shielded region into low frequency components and high frequency components. Then, a comparison is made between the high frequency components to make the aforementioned prediction using the pre-captured dark current high frequency components. This is because the dark current noise varies from pixel to pixel, and thus contains many high frequency components and is not position sensitive. This is also because the low frequency components predominantly include position-sensitive noises such as due to the characteristics of the power supply or the device, and thus the prediction of dark current noise cannot be made properly if low frequency components are included when making the prediction.

A description will now be made to the configuration of the dark current noise eliminator 1001. The dark current noise eliminator 1001 includes the noise distribution analysis section 1010, a quantization section 1012, a memory 1014, a first inverse quantization section 1018, a second inverse quantization section 1020, a high frequency extraction section 1022, a multiplier coefficient setting section 1024, a multiplication section 1026, an addition section 1028, and a subtraction section 1030. The noise distribution analysis section 1010 analyzes the dark current noise components, which are captured with the shutter 1003 closed, by counting the number of pixels occurring at their respective possible values over all the pixels to determine the distribution thereof.

For example, suppose that the dark current noise components of an image have values as shown below for each of 10 pixels that constitute the image;

{1, 3, 2, 5, 3, 3, 4, 5, 3, 2}.

If the dark current noise components can have values of 0 to 7, the noise distribution analysis section 1010 determines the number of pixels occurring at these respective values as follows:

0 pixels at value 0, 1 pixel at value 1, 2 pixels at value 2, 4 pixels at value 3, 1 pixel at value 4, 2 pixels at value 5, 0 pixels at value 6, and 0 pixels at value 7.

Figure 8:
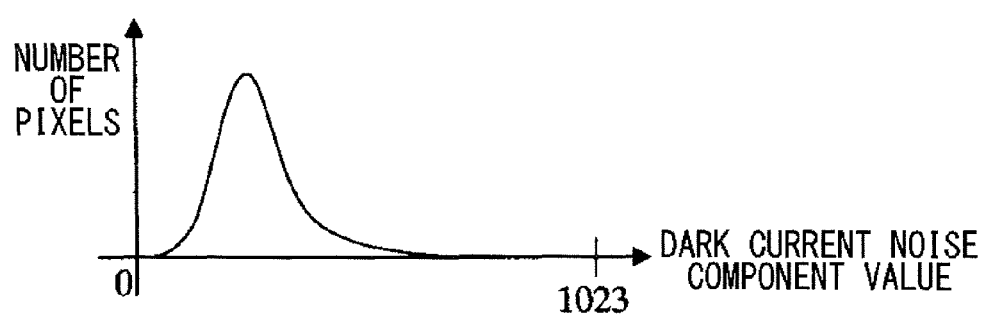
FIG. 8 is a view illustrating the magnitude distribution of dark current noise components.

The number of pixels of an image actually captured by the imaging device 1004 is several hundreds of thousands to several millions. Additionally, the possible values taken by a dark current noise component depends on the resolution of the A/D conversion section 1005. For example, if the A/D conversion section 1005 has a resolution of 10 bits, then the possible values taken by the dark current noise component are 0 to 1023. In this case, the noise distribution analysis section 1010 analyzes the dark current noise components of all the pixels acquired by the imaging device 1004 to determine the number of pixels occurring at their respective possible values of 0 to 1023. As a result, a distribution such as that shown in FIG. 8 can be obtained.

Figure 9:
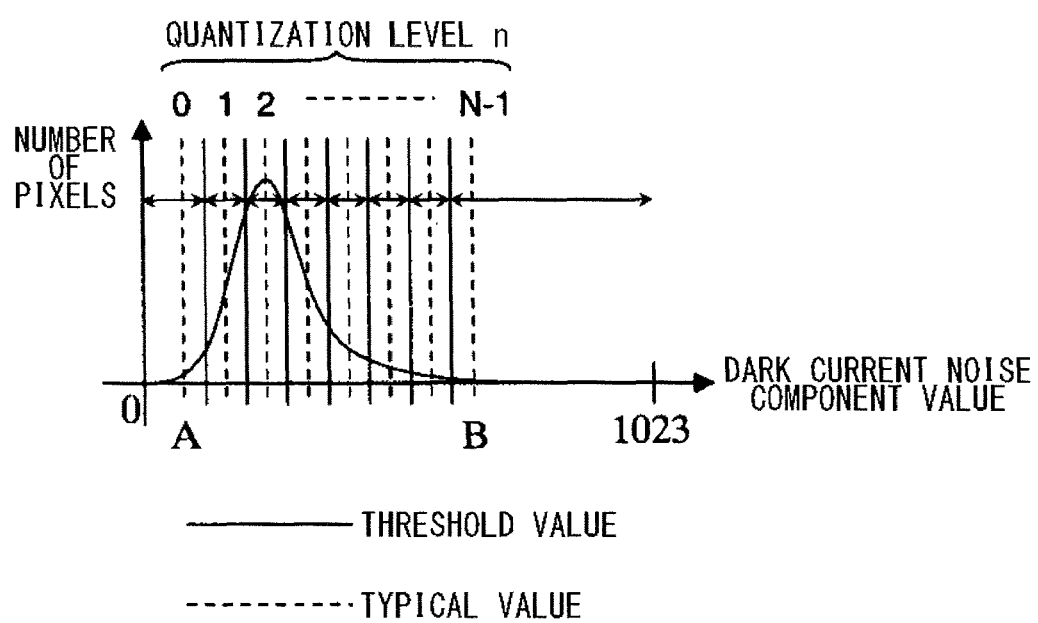
FIG. 9 is an explanatory view showing how to specify a range that includes the peak magnitude of dark current noise components and then compute the threshold and typical values for quantization within the range.

After having determined the distribution of the dark current noise components, the noise distribution analysis section 1010 specifies a range from A to B within which the peak of the dark current noise components is included as shown in FIG. 9. For example, assume that the lower limit A of this range is the value of the dark current noise component of the (x/512)th pixel given when counted in ascending order of the pixel values, where x is the number of pixels employed to determine the distribution. Assume also that the upper limit B is the value of the dark current noise component of the (x/512)th pixel given when counted in descending order of the pixel values. Note that this divisor is not limited to 512 but may be any value. Additionally, different divisors may also be used for the lower limit A and the upper limit B. Furthermore, the divisor may also be such a variable that can be externally defined.

As an alternative method for determining the lower limit A and the upper limit B of this range, the peak position of the distribution of dark current noise components may be specified in order to define the lower limit A and the upper limit B so that the number of pixels present between the lower limit A and the peak and the number of pixels present between the upper limit B and the peak take on a certain given value.

After having specified the range from A to B, the noise distribution analysis section 1010 computes threshold and typical values for quantization to define threshold values within this range for compression by quantization. For example, consider a case where the dark current noise components are quantized into N levels as shown in FIG. 9. In addition, these levels are labeled as quantization level 0, quantization level 1, quantization level 2, . . . , and quantization level (N−1) in ascending order of the dark current noise component values from zero to the greatest value. These levels are collectively represented by a quantization level n (n=0, 1, 2, . . . , N−1). The noise distribution analysis section 1010 determines the threshold value THn between the quantization level n and the quantization level (n+1), and the typical value Vn of the quantization level n by the following equation.

$$THn=DA+(2n+1)*(DB-DA)/(2*(N-1)) \quad (3),$$

and $$Vn=DA+2n*(DB-DA)/(2*(N-1)) \quad (4),$$

where DA and DB represent the values of the dark current noise components at the lower limit A and the upper limit B. The threshold value THn is sent to the quantization section 1012. Additionally, the threshold value THn, the typical value Vn, and the dark current noise component DA at the lower limit A are sent to the first inverse quantization section 1018 and the second inverse quantization section 1020.

With reference to the quantization threshold values determined by the noise distribution analysis section 1010, the quantization section 1012 quantizes the dark current noise components captured with the shutter 1003 closed. For example, assuming that a dark current noise component has a magnitude of "a," a method described below is employed for quantization with reference to the threshold value THn determined by Equation (3), thereby yielding post-quantization data α.

If the dark current noise component "a" is less than the threshold value TH0, then the quantized data a is to be 0. On the other hand, if the dark current noise component "a" is equal to or greater than the threshold value THIN-2), then the quantized data α is to be (N−1). Additionally, if the dark current noise component "a" is equal to or greater than the threshold value TH(n−1) and less than THn, then the quantized data α is to be n.

The data α quantized at the quantization section 1012 in this manner is stored in the memory 1014. At this time, the memory 1014 may require less capacity compared with a case where dark current noise components are not quantized. For example, assuming that N is 16, the quantized data α takes on values of 0 to 15. That is, a dark current noise component of a pixel which is originally expressed with 10 bits can be represented with 4 bits after having been quantized. Accordingly, to store the dark current noise components of one million pixels in the memory 1014, a capacity of ten million bits would be required if they are not quantized, whereas just four million bits are sufficient if they are quantized.

In sync with the delivery from the A/D conversion section 1005 of an image signal acquired when an image is actually captured with the shutter 1003 open, a low/high frequency separation section 1016 reads the quantized dark current noise components from the memory 1014 to separate them into low frequency components and high frequency components. For example, the low/high frequency separation section 1016 separates a quantized dark current noise component Qx of a pixel X into a low frequency component Lx and a high frequency component Hx in accordance with the following equations.

$$L_x=\min2(Q_x,Q_{x+1},Q_{x+2},\ldots,Q_{x+15}) \quad (5), \text{ and}$$

$$H_x=Q_x-L_x \quad (6),$$

where $Q_{x+1}$ to $Q_{x+15}$ represent the respective magnitudes of quantized dark current noise components of 15 adjacent pixels that are to the left of the pixel X.

Additionally, the function min2 is a function for outputting the second smallest value of those values listed within the brackets. That is, the low/high frequency separation method relying on Equations (5) and (6) employs, as a low frequency component, the second smallest value out of those values of the dark current noise components for a total of 16 pixels, i.e., the pixel to be separated and the 15 adjacent pixels to the left of that pixel. The method also employs a high frequency component provided by subtracting the low frequency component from the dark current noise component of the pixel being separated. The minimum value out of those values of the dark current noise components for the 16 pixels is not employed as the low frequency component so as to avoid employing a low level signal delivered by a defect pixel as the low frequency component.

With reference to the threshold value THn and the typical value Vn supplied from the noise distribution analysis section 1010, the first inverse quantization section 1018 inversely quantizes the high frequency component $H_x$ separated by the low/high frequency separation section 1016, for example, by the following equation.

$$IH_x=H_x\times(Vn-THn) \quad (7),$$

where $IH_x$ is the high frequency component of the inversely quantized dark current noise, and sent to the multiplication section 1026.

Furthermore, with reference to the threshold value THn and the typical value Vn supplied from the noise distribution analysis section 1010, the second inverse quantization section 1020 inversely quantizes and decompresses the low frequency components $L_x$ separated by the low/high frequency separation section 1016.

$$IL_x=L_x\times(Vn-THn) \quad (8),$$

where $IL_x$ is the low frequency component of the inversely quantized dark current noise. The second inverse quantization section 1020 sends, to the addition section 1028, a value obtained by adding the $IL_x$ to the value DA of the dark current noise component at the lower limit A supplied from the noise distribution analysis section 1010.

With the image signals captured with the shutter 1003 closed and with the shutter 1003 opened, the high frequency extraction section 1022 extracts high frequency components from an image signal delivered from the light-shielded region provided at an end portion of the imaging device 1004 and then determines the average value of the high frequency components for output to the multiplier coefficient setting section 1024. The high frequency components are computed using Equations (5) and (6) as with the low/high frequency separation section 1016.

The multiplier coefficient setting section 1024 acquires and stores the average value of the high frequency components of the light-shielded region that has been computed at the high frequency extraction section 1022 from the dark current noise components pre-captured with the shutter 1003 closed. The multiplier coefficient setting section 1024 also acquires, from the high frequency extraction section 1022, the average value of the high frequency components of the light-shielded region in the image signal captured with the shutter 1003 opened. Of those image signals captured under this condition, the image signal delivered from a pixel in the light-shielded region is the dark current noise component of the pixel at the time at which the image was captured. Accordingly, the ratio thereof to the average value of the high frequency components in the light-shielded region of the pre-stored dark current noise components is determined, and then the inversely quantized high frequency components of the dark current noise is multiplied by this ratio as the multiplier coefficient. It is thus possible to predict the high frequency components of the dark current noise included in the captured image signal.

The multiplication section 1026 multiplies the high frequency components of the dark current noise components decompressed at the first inverse quantization section by the multiplier coefficient delivered from the multiplier coefficient setting section 1024, thereby predicting the high frequency components of the dark current noise components included in the image signal. The addition section 1028 adds the value delivered from the second inverse quantization section to the predicted high frequency components, thereby creating dark current noise components. Then, the subtraction section 1030 subtracts the dark current noise components created at the addition section 1028 from the image signal acquired under actual capturing condition, thereby eliminating the dark current noise from the image signal.

Based on the arrangement described above, a description will now be made to the operation of the digital camera shown in FIG. 7. First, with the shutter 1003 closed, the imaging device 1004 acquires an image. At this time, since no light is incident upon the imaging device 1004, the image signal delivered from the imaging device 1004 is indicative of dark current noise components (A).

The dark current noise components (A) are converted at the A/D conversion section 1005 into a digital signal, which is in turn supplied to the noise distribution analysis section 1010. Then, the noise distribution analysis section 1010 determines the magnitude distribution of dark current noise components of all pixels, and uses this distribution to compute the threshold value THn and the typical value Vn for quantization.

Next, again with the shutter 1003 closed, the dark current noise components (B) are captured in the imaging device 1004. The dark current noise components (B) are converted at the A/D conversion section 1005 into a digital signal, which is in turn supplied, this time, to the quantization section 1012. Based on the threshold value Vn determined by the noise distribution analysis section 1010, the quantization section 1012 quantizes the dark current noise components (B). The memory 1014 stores the quantized dark current noise components (B).

The captured dark current noise components (B) are then also supplied to the high frequency extraction section 1022. The high frequency extraction section 1022 extracts high frequency components from the dark current noise components (B) included within the light-shielded region of the imaging device 1004 to determine the average value thereof. This average value is sent to and stored in the multiplier coefficient setting section 1024.

The aforementioned operation is performed before an image of a subject is actually captured. The aforementioned operation may be performed each time an image is captured or at power-on of the digital camera. To perform the operation each time an image is captured, an image capture time detection section (not shown) may be provided to instruct the dark current noise eliminator 1001 to perform the operation up to this step when an image capture time is detected. Dark current noise is susceptible to the ambient temperature of the imaging device. Thus, the dark current noise stored immediately before capturing an image would allow the dark current noise component values to be acquired with the highest accuracy. To perform the operation at the power-on, a power-on time detection section (not shown) may be provided to instruct the dark current noise eliminator 1001 to perform the operation up to this step when a power-on event is detected.

Alternatively, the operation before an image of a subject is actually captured may be performed during the manufacture of the digital camera. Alternatively, the digital camera may be provided with a timer (not shown) to instruct the dark current noise eliminator 1001 at certain time intervals to perform the operation up to this step.

A description will now be made to the operation for actually capturing an image of a subject. This time, with the shutter 1003 opened, the imaging device 1004 captures an image (C). The image signal (C) delivered from the imaging device 1004 is converted at the A/D conversion section 1005 into a digital signal, which is in turn sent to the subtraction section 1030 and also to the high frequency extraction section 1022. The high frequency extraction section 1022 extracts high frequency components from the image signal (C) included within the light-shielded region of the imaging device 1004 and determines the average value thereof, which is then sent to the multiplier coefficient setting section 1024. The multiplier coefficient setting section 1024 computes the ratio between the average value of the high frequency components of the image signal (C) included in the light-shielded region sent from the high frequency extraction section and the average value of the high frequency components of the stored dark current noise components (B). The ratio is then sent as a multiplier coefficient to the multiplication section 1026.

In sync with the delivery of the image signal (C) from the A/D conversion section 1005, the low/high frequency separation section 1016 reads the quantized dark current noise components (B) stored in the memory 1014 to separate them into low frequency components (BL) and high frequency components (BH). The separated high frequency components (BH) are inversely quantized at the first inverse quantization section 1018, and then multiplied at the multiplication section 1026 by the multiplier coefficient determined at the multiplier coefficient setting section 1024. This allows the high frequency components of the dark current noise components included in the image signal to be predicted and sent to the addition section 1028. Additionally, the separated low frequency components (BL) are sent to the addition section 1028 after having been inversely quantized at the second inverse quantization section 1020.

The addition section 1028 adds the inversely quantized low frequency components (BL) of the dark current noise and the predicted high frequency components (BH) of the dark current noise, thereby restoring the dark current noise (BD). Then, the restored dark current noise components (BD) are supplied to the subtraction section 1030, so that the subtraction section 1030 subtracts the restored dark current noise components (BD) from the image signal (C). It is thus possible to eliminate the dark current noise components (BD) from the image signal (C). Then, the image signal (CD) with the dark current noise components (BD) having been eliminated is written on the storage medium 1006.

As described above, the fourth embodiment provides the following operational effects.

(1) An image signal delivered from a pixel in a light-shielded region is compared with the pre-stored dark current noise component of the same pixel to thereby compute a multiplier coefficient, by which the pre-stored dark current noise component is multiplied. It is thus possible to predict dark current noise components included in the image signal with high accuracy. Accordingly, it is possible to eliminate the dark current noise components included in an image signal with high accuracy.

(2) Dark current noise is dominated by high frequency components. Thus, as in the fourth embodiment, to compute a multiplier coefficient, high frequency components of multiple pixels are extracted respectively from an image signal and pre-stored dark current noise components to compare the high frequency components with each other, thereby deriving a multiplier coefficient. At the same time, a prediction can be made for only the high frequency components of the dark current noise, thereby predicting the dark current noise components with higher accuracy.

(3) In predicting dark current noise components, part of the process (in the fourth embodiment, the process for separating the dark current noise components into low frequency components and high frequency components) can be performed before decompression by inverse quantization. This makes it possible to perform the processing on the data compressed and thus reduced in volume, thereby reducing the amount of computation required for the prediction.

In the foregoing, the present invention has been described in accordance with the fourth embodiment. It will be understood by those skilled in the art that the embodiment is only illustrative and various modifications can be made to the combinations of each of its components and process steps, and those modifications will also fall within the scope of the present invention.

Furthermore, the aforementioned fourth embodiment illustrates an example of a digital camera; however, the invention is not limited thereto. The dark current noise eliminator according to the embodiment of the present invention can be incorporated into any device so long as it has an imaging device.

Note that in the fourth embodiment described above, such an example has been shown in which the high frequency extraction section 1022 extracts the high frequency components of a plurality of pixels from an image signal delivered from a light-shielded region, and the average value of the high frequency components is determined. However, the invention is not limited thereto, but may also be adapted to determine the median or the root mean square of the high frequency components of a plurality of pixels.

Furthermore, in the aforementioned fourth embodiment, the high frequency extraction section 1022 determines the average values of the high frequency components of a plurality of pixels extracted from dark current noise components and image signals, and the multiplier coefficient setting section 1024 determines the ratio between these average values to compute a multiplier coefficient. However, it is also acceptable to determine a ratio for each pixel between the high frequency components of the dark current noise component and the image signal extracted at the high frequency extraction section 1022. Then, the average value, the median, or the root mean square average value of these ratios may be adopted as the multiplier coefficient.

Third Group

Fifth Embodiment

Figure 10:
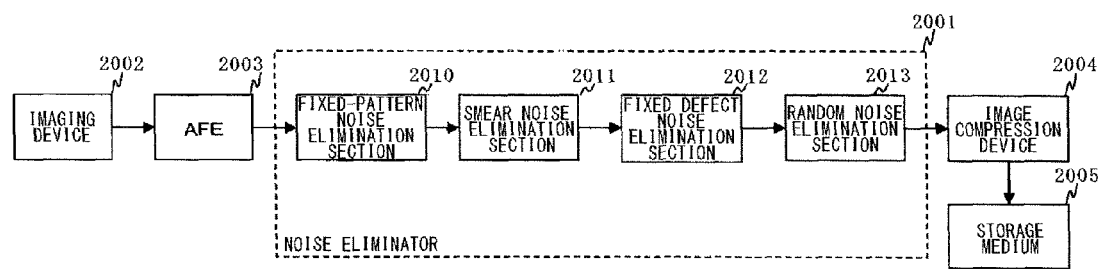
FIG. 10 is a view illustrating the configuration of a digital camera according to a fifth embodiment.

FIG. 10 is a view illustrating the configuration of a digital camera 2100 with a noise eliminator 2001 according to a fifth embodiment of the present invention. This arrangement can be implemented with hardware such as a CPU of any computer, a memory device, and other LSIs, or with software such as a memory-loaded program having a coding function. Illustrated here is the configuration of functional blocks that is implemented by a combination of them. Accordingly, it will be understood by those skilled in the art that the configuration of functional blocks can be implemented in a variety of ways, for example, only with hardware, only with software, or with a combination thereof.

In addition to the noise eliminator 2001, the digital camera 2100 includes an imaging device 2002, an Analog Front End (AFE) 2003, an image compression device 2004, and a storage medium 2005. In the digital camera 2100, the imaging device 2002 converts incident light into an electrical signal, and the AFE 2003 extracts an image signal from the output signal delivered by the imaging device 2002 to amplify and then converts the resulting signal into a digital signal. However, the image signal extracted at the AFE 2003 contains various noise components that will be eliminated by the noise eliminator 2001, discussed in detail later. Then, the image signal with its noise eliminated by the image compression device 2004 is compressed and then written in the storage medium 2005.

Figure 11:
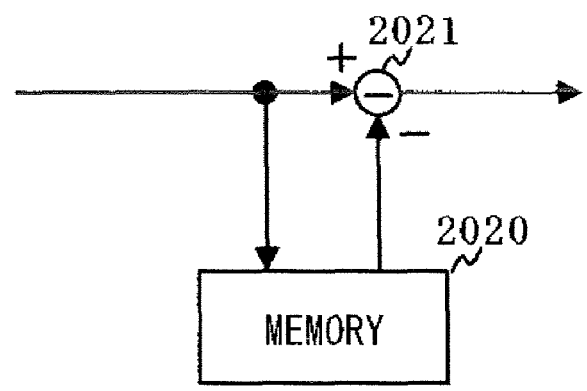
FIG. 11 is a view illustrating the configuration of a fixed-pattern noise elimination section according to the fifth embodiment.

The noise eliminator 2001 includes a fixed-pattern noise elimination section 2010, a smear noise elimination section 2011, a fixed defect noise elimination section 2012, and a random noise elimination section 2013. FIG. 11 is a view illustrating the configuration of the fixed-pattern noise elimination section 2010. The fixed-pattern noise elimination section 2010 includes a memory 2020 and a subtraction section 2021. The memory 2020 stores an image signal pre-captured at the imaging device 2002 with no incident light. Alternatively, the image signal may be compressed and stored in the memory 2020, or information associated with the image signal may be stored therein. The image signal captured without incident light corresponds to fixed pattern noise caused by dark current.

An image signal acquired by the imaging device 2002 under the actual capturing condition, i.e., with incident light is supplied via the AFE 2003 to the fixed-pattern noise elimination section 2010. In sync with that timing, the fixed pattern noise of each pixel that constitutes the image signal is read from the memory 2020 and then sent to the subtraction section 2021. The data stored in the memory 2020 may be compressed image signals or information associated with image signals. In this case, in sync with the aforementioned timing, a compressed image signal for each pixel or the information associated with the image signal is read from the memory 2020. After the fixed pattern noise is restored from the signal or the information, the restored fixed pattern noise is sent to the subtraction section 2021. Then, the subtraction section 2021 subtracts the fixed pattern noise from the image signal acquired with incident light, thereby eliminating the fixed pattern noise.

The fixed-pattern noise elimination section 2010 may be configured as the dark current noise eliminator 1, 7, 8, or 1001 as described above in the first to fourth embodiments. As used herein, the fixed pattern noise corresponds to the dark current noise in the first to fourth embodiments.

Figure 12:
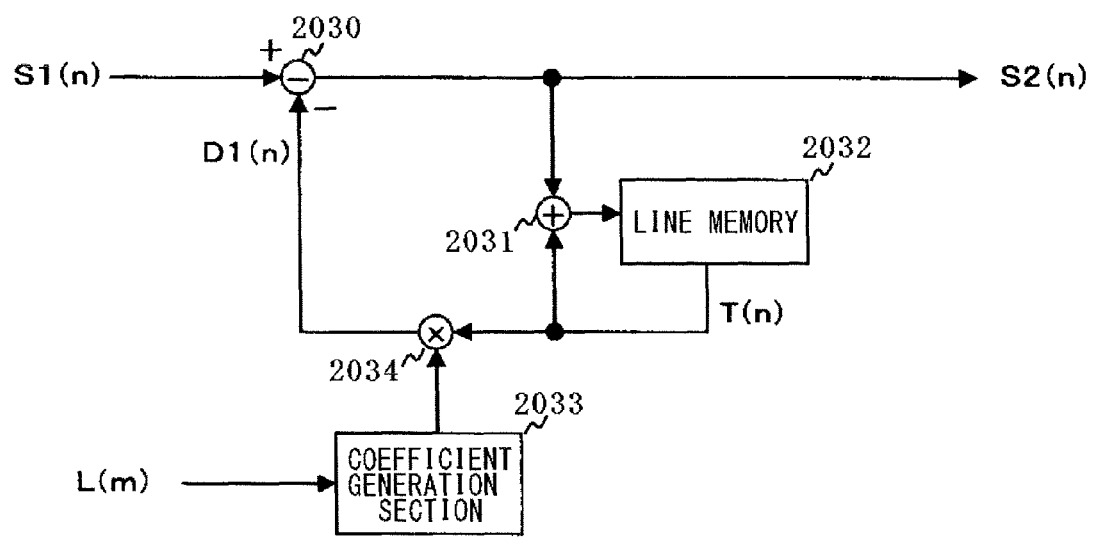
FIG. 12 is a view illustrating the configuration of a smear noise elimination section according to the fifth embodiment.

FIG. 12 is a view illustrating the configuration of the smear noise elimination section 2011. The smear noise elimination section 2011 includes a subtraction section 2030, an addition section 2031, a line memory 2032, a coefficient generation section 2033, and a multiplication section 2034. The subtraction section 2030 subtracts a first smear noise component D1 (n) from an image signal S1 (n) that is continually supplied line by line, and then outputs the resulting signal as an image signal S2 (n) that contains no smear noise component. The addition section 2031 adds the image signal S2 (n) delivered from the subtraction section 2030 and cumulative sum data T (n) read from the line memory 2032, and then supplies the sum data to the line memory 2032. The line memory 2032 is reset each time a screenful of image signals S1 (n) is completely supplied, and then stores line by line the sum data supplied from the addition section 2031. Thus, the addition section 2031 cumulatively adds up a screenful of image signals S2 (n) column by column, and the line memory 2032 stores the cumulative sum data T (n).

In response to exposure data L (m) indicative of the exposure state of the imaging device 2002, the coefficient generation section 2033 generates a coefficient k associated with the duration of exposure at each light-receiving bit of the imaging device 2002 and supplies it to the multiplication section 2034. The multiplication section 2034 multiplies the cumulative sum data T (n) read from the line memory 2032 by the coefficient k to create the smear noise component D1 (n).

With the smear noise elimination section 2011, each time information charges accumulated in each light-receiving bit of the imaging device 2002 are transferred vertically line by line, the amount of smear charges coming from each light-receiving bit is cumulatively added up in sequence. Then, since a smear noise component arising during the transfer of information charges is expressed by the cumulative sum value, it is possible to eliminate smear noise by subtracting this value from the image signal S1 (n).

Figure 13:
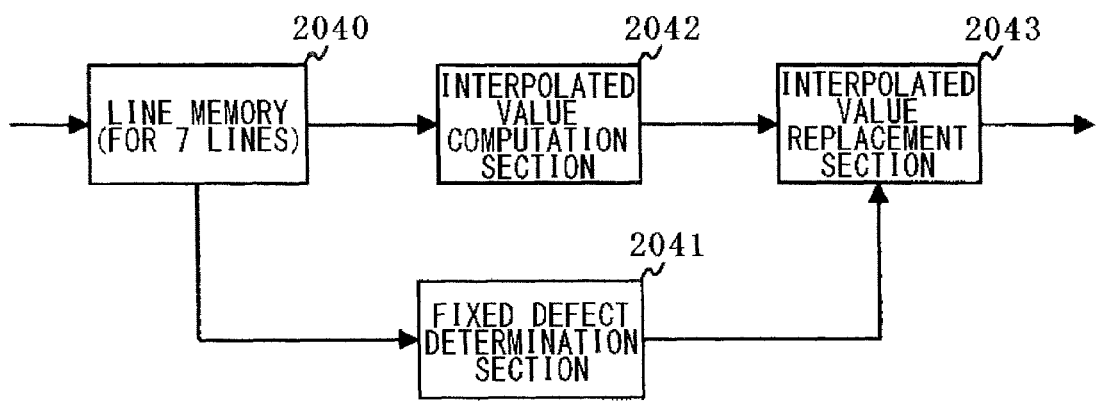
FIG. 13 is a view illustrating the configuration of a fixed defect noise elimination section according to the fifth embodiment.

The fixed defect noise elimination section 2012 determines whether each pixel is a fixed defect. If a pixel is determined to be a fixed defect, an interpolated value is computed from surrounding pixels to replace the pixel with the value. FIG. 13 is a view illustrating the configuration of the fixed defect noise elimination section 2012. The fixed defect noise elimination section 2012 includes a line memory 2040, a fixed defect determination section 2041, an interpolated value computation section 2042, and an interpolated value replacement section 2043.

The line memory 2040 stores an image signal line by line that is continually supplied line by line. The line memory 2040 can store 7 lines of image signals. When a new image signal is supplied to add to the 7 lines of image signals, the image signal of the oldest stored line is overwritten with the newly supplied image signal, thereby updating the contents of the line memory 2040.

Figure 14:
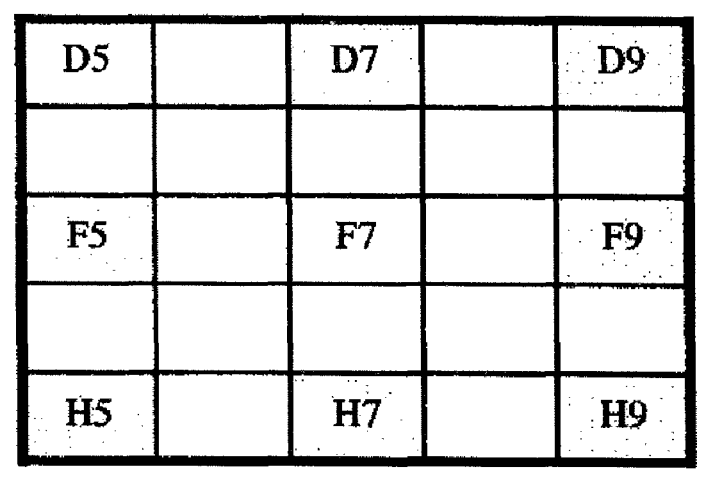

The fixed defect determination section 2041 determines whether each pixel is a fixed defect. For example, suppose that it is determined whether a pixel F7 shown in FIG. 14 is a fixed defect. In this case, the image signals of surrounding pixels D5, D7, D9, F5, F9, H5, H7, and H9 are read from the line memory 2040. Then, the maximum and minimum values of the image signals of these surrounding pixels are determined to compare them with the magnitude of the image signal of the pixel F7. As a result, if the magnitude of the image signal of the pixel F7 is extraordinarily greater than the maximum value of the image signals of the surrounding pixels or extraordinarily less than the minimum value, then the pixel F7 is determined to be a fixed defect. Otherwise, it is determined that there is no fixed defect. The fixed defect determination section 2041 makes this determination with all pixels that constitute the image.

The interpolated value computation section 2042 computes an interpolated value based on the values of those pixels surrounding a pixel on which a determination is being made by the fixed defect determination section 2041 whether it is a fixed defect. If the fixed defect determination section 2041 has determined that the pixel is a fixed defect, the interpolated value replacement section 2043 replaces the image signal of the pixel with the interpolated value computed at the interpolated value computation section 2042 for external output. Otherwise, the image signal of the pixel is outputted as it is, thereby eliminating the fixed defect noise.

The random noise elimination section 2013 is configured generally in the same manner as the fixed defect noise elimination section 2012 shown in FIG. 13. However, when making a determination of whether random noise exists, the maximum value of the image signals of the surrounding pixels is defined as the upper threshold limit, and the minimum value of the image signals of the surrounding pixels is defined as the lower threshold limit. Then, if the magnitude of the image signal of the pixel to be determined falls outside the range that is defined by the upper threshold limit and the lower threshold limit, then it is determined that the pixel has random noise. Then, when it is determined that the pixel has random noise, it is replaced with the interpolated value computed from the pixel values of the surrounding pixels, whereas if it is determined that the pixel has no random noise, the image signal of the pixel is outputted as it is.

Based on the arrangement described above, description will be made to the operation of the digital camera 2100 of FIG. 10. First, the digital camera 2100 allows the imaging device 2002 to capture an image with no incident light. The image captured at this time is indicative of fixed pattern noise components caused by dark current. This image is sent to the fixed-pattern noise elimination section 2010 of the noise eliminator 2001 via the AFE 2003 and stored therein.

The aforementioned operation is performed before an image of a subject is actually captured. The aforementioned operation may be performed each time an image is captured or at power-on of the digital camera. To perform the operation each time an image is captured, an image capture time detection section (not shown) may be provided to instruct the fixed-pattern noise elimination section 2010 to perform the operation up to this step when an image capture time is detected. Dark current noise is susceptible to the ambient temperature of the imaging device. Thus, the dark current noise stored immediately before capturing an image allows the dark current noise component values to be acquired with the highest accuracy. To perform the operation at the power-on, a power-on time detection section (not shown) may be provided to instruct the fixed-pattern noise elimination section 2010 to perform the operation up to this step when a power-on event is detected.

Furthermore, the operation before an image of a subject is actually captured may be performed during the manufacture of the digital camera. Alternatively, the digital camera may be provided with a timer (not shown) to instruct the fixed-pattern noise elimination section 2010 at certain time intervals to perform the operation up to this step.

A description will now be made to the operation for actually capturing an image of a subject. This time, the digital camera 2100 allows the imaging device 2002 to capture an image with incident light, and the image signal is then sent to the noise eliminator 2001 via the AFE 2003. In the noise eliminator 2001, the fixed-pattern noise elimination section 2010 first eliminates the fixed pattern noise from the image signal, and then the smear noise elimination section 2011 eliminates the smear noise. Then, the fixed defect noise elimination section 2012 eliminates the fixed defect noise, and the random noise elimination section 2013 further eliminates the random noise. The image signal with a plurality of noises having been eliminated in this order is subjected to image compression at the image compression device 2004 and then written on the storage medium 2005.

The fifth embodiment is characterized in that the noise eliminator 2001 eliminates a plurality of noises in the order of fixed pattern noise, smear noise, fixed defect noise, and random noise. This sequence makes it possible to eliminate each noise with high accuracy for the following reasons. For example, the smear noise requires to estimate the amount of incident light as described above, and this estimation is performed based on the captured image signal. Thus, too much noise in the image signal would degrade the accuracy of estimating the amount of incident light, resulting in degradation in the accuracy of computing smear noise to be eliminated. In particular, when an image signal to be used for the estimation includes fixed pattern noise that has a temperature dependence and increases in proportion to the exposure time, it is difficult to estimate smear noise with high accuracy. For this reason, the fixed pattern noise is desirably eliminated from the image signal before the smear noise is eliminated.

Next, the fixed defect noise is desirably eliminated from an image from which a certain amount of noise has been already removed because surrounding pixels are used to determine a defect pixel and estimate an interpolative pixel with which to replace the defect pixel. Furthermore, the smear noise may reach such a level at which the signal level is saturated depending on the amount of incident light, causing the fixed defect noise to be conversely buried.

Accordingly, the smear noise may be desirably eliminated before the fixed defect noise is removed.

Furthermore, when compared with the other types of noise, the random noise has a very low signal level, thus having less effects on the removal of smear noise and fixed defect noise. However, it may cause noticeable image graininess. The random noise is removed by estimated interpolation based on the features of surrounding pixels, and is thus desirably carried out at the final stage of noise elimination, at which the other noise components have been already removed so that the pixels reveal their substantially true pixel values. Note that as described above, the random noise has a very low level when compared with the other types of noise, and thus the noise eliminator 2001 may not need to have the random noise elimination section.

As can be seen from above, the fifth embodiment makes it possible to remove each of the noises with the highest accuracy by orderly eliminating the noises, i.e., by removing first the fixed pattern noise, then the smear noise, and next the fixed defect noise. Additionally, when the random noise is to be eliminated, it may be eliminated after the other noise components have been removed, thereby allowing each of the noises including the random noise to be eliminated with the highest accuracy.

Sixth Embodiment

Figure 15:
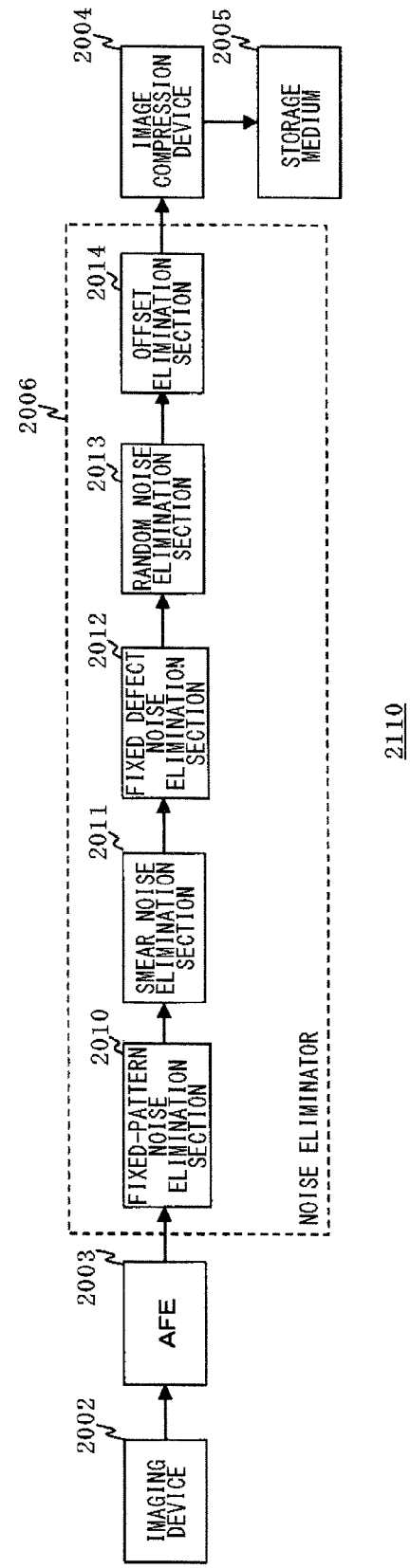
FIG. 15 is a view illustrating the configuration of a digital camera according to a sixth embodiment.

FIG. 15 is a view illustrating the configuration of a digital camera 2110 with a noise eliminator 2006 according to a sixth preferred embodiment of the present invention. The noise eliminator 2006 is different from the noise eliminator 2001 of FIG. 10 in that an offset elimination section 2014 is additionally provided downstream of the random noise elimination section 2013. The components which are the same as those of the fifth embodiment are indicated with the same reference symbols and will not be repeatedly explained.

An image signal delivered from the imaging device 2002 will not have a zero level even if it is at a black level but includes a certain offset component. The offset elimination section 2014 eliminates the offset component from the image signal.

Figure 16:
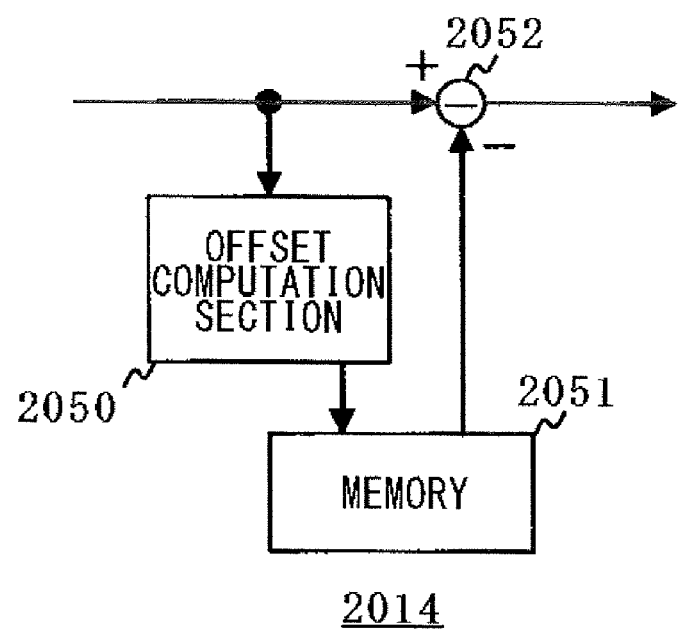
FIG. 16 is a view illustrating the configuration of an offset elimination section according to the sixth embodiment.

FIG. 16 is a view illustrating the configuration of the offset elimination section 2014. The offset elimination section 2014 includes an offset computation section 2050, a memory 2051, and a subtraction section 2052. Of those image signals delivered from the imaging device 2002, the offset computation section 2050 extracts the image signals of some pixels that belong to a region (a light-shielded region) which is provided on an edge portion of the imaging device 2002 and on which no light is incident. The magnitude of an image signal delivered from the light-shielded region is the magnitude of the black level of the imaging device 2002. Accordingly, the offset computation section 2050 employs the average value of the magnitudes of image signals as the offset component, which is in turn stored in the memory 2051. Then, the subtraction section 2052 subtracts the offset component stored in the memory 2051 from an image signal, thereby eliminating the offset component.

Based on the arrangement described above, a description will be made to the operation of the digital camera 2110 shown in FIG. 15. First, Like the digital camera 2100 shown in FIG. 10, the digital camera 2110 allows the imaging device 2002 to capture an image with no incident light. Then, this image is sent to the fixed-pattern noise elimination section 2010 of the noise eliminator 2006 via the AFE 2003 and stored as fixed pattern noise.

The aforementioned operation is performed before an image of a subject is actually captured. A description will now be made to the operation for actually capturing an image of a subject. This time, the digital camera 2110 allows the imaging device 2002 to capture an image with incident light, and the image signal is then sent to the noise eliminator 2006 via the AFE 2003. In the noise eliminator 2006, the fixed-pattern noise elimination section 2010 first eliminates the fixed pattern noise from the image signal, and then the smear noise elimination section 2011 eliminates the smear noise. Then, the fixed defect noise elimination section 2012 eliminates the fixed defect noise, and the random noise elimination section 2013 further eliminates the random noise. In addition, the offset elimination section 2014 eliminates the offset component. The image signal with a plurality of noises having been eliminated in this order is subjected to image compression at the image compression device 2004 and then written in the storage medium 2005.

The sixth embodiment is characterized in that the noise eliminator 2006 eliminates the fixed pattern noise and thereafter eliminates the offset component, thereby making it possible to eliminate the offset component with high accuracy for the following reasons. That is, when the offset component is computed, the image signal of a pixel included in the light-shielded region of the imaging device 2002, and the image signal contains a large amount of fixed pattern noise that is caused by dark current. As mentioned above, the fixed pattern noise has a temperature dependence and increases in proportion to the exposure time, and thus computing the offset component with fixed pattern noise contained therein would cause a degradation in the accuracy of the computation. For this reason, the fixed pattern noise is desirably eliminated before the offset component is removed. This makes it possible to remove the offset component with better accuracy and improve the quality of images.

Note that in the sixth embodiment, such an example has been shown in which the offset elimination section 2014 is disposed downstream of the random noise elimination section 2013; however, the invention is not limited thereto. Any arrangement is included in the scope of the present invention so long as the offset elimination section 2014 is disposed downstream of the fixed-pattern noise elimination section 2010.

In the foregoing, the present invention has been described in accordance with the fifth and sixth embodiments. It will be understood by those skilled in the art that those embodiments are only illustrative and various modifications can be made to the combinations of each of their components and process steps, and those modifications will also fall within the scope of the present invention.

Furthermore, the aforementioned embodiments illustrate an example of a digital camera; however, the invention is not limited thereto. The noise eliminator according to the embodiments of the present invention can be incorporated into any device so long as it has an imaging

INDUSTRIAL APPLICABILITY

The present invention is applicable to an apparatus which removes noise from imaging devices.

What is claimed is:

1. A noise eliminator, comprising:
   a noise distribution analysis section which analyzes a first image signal acquired by an imaging device with light blocked to determine the magnitude distribution of the first image signal of some or all pixels constituting the imaging device, specifies from this distribution a range within which a peak magnitude of the first image signal is included, and defines a threshold value within this range;
   a quantization section which quantizes, based on the threshold value, a second image signal acquired by the imaging device with light blocked;
   an inverse quantization section which inversely quantizes the quantized second image signal; and
   a subtraction section which subtracts the inversely quantized second image signal from a third image signal acquired by the imaging device with light incident thereon.

2. A noise eliminator according to claim 1, wherein the first image signal and the second image signal are required at different points in time.

3. A noise elimination method, comprising: determining a magnitude distribution of dark current noise components of an image signal acquired by an imaging device with light blocked; specifying a range within which a magnitude peak of the dark current noise components is included; defining a threshold value for quantization within the range; quantizing the dark current noise components based on the threshold value; inversely quantizing the quantized dark current noise components; and subtracting the inversely quantized dark current noise components from an image signal acquired when an image of a subject is actually captured.

* * * * *